May 5, 1970          F. N. MASTRUP          3,510,801
OPTICAL PUMP SYSTEM FOR REPETITIVE OPERATION

Filed Jan. 19, 1968          2 Sheets-Sheet 1

Frithjof N. Mastrup
INVENTOR.

BY *Edward Depas*
ATTORNEY

May 5, 1970 F. N. MASTRUP 3,510,801
OPTICAL PUMP SYSTEM FOR REPETITIVE OPERATION
Filed Jan. 19, 1968 2 Sheets-Sheet 2

Frithjof N. Mastrup
*INVENTOR.*

United States Patent Office 3,510,801
Patented May 5, 1970

3,510,801
OPTICAL PUMP SYSTEM FOR REPETITIVE OPERATION
Frithjof N. Mastrup, Manhattan Beach, Calif., assignor to TRW Inc., Redondo Beach, Calif., a corporation of Ohio
Filed Jan. 19, 1968, Ser. No. 699,219
Int. Cl. H01s 3/09
U.S. Cl. 331—94.5                                                15 Claims

ABSTRACT OF THE DISCLOSURE

A high-energy light source particularly adaptable to pumping a laserable material, wherein the laserable material is positioned within a transparent cylindrical first member with a transparent cylindrical second member having a diameter slightly larger than the first member forming a water-tight passageway with the first member and wherein a plurality of hollow water-tight cooling discs are symmetrically disposed about the second cylindrical member and axially displaced therealong to define a second passageway for receiving a gas. Annular electrodes are positioned symmetrically about the second member to create an arc discharge in the second passageway to ionize the gas contained therein which in turn emits optical radiation of a predetermined frequency band for pumping the laserable material. Water is passed through the hollow cooling discs and through the first defined passageway to dissipate heat generated by the laserable material and the gas plasma.

BACKGROUND OF THE INVENTION

The present invention is directed to an apparatus for generating optical frequency radiation and, more particularly, to a high intensity, electrically energized gas discharge light source particularly adaptable for optically pumping a laserable material. Various types of high-intensity gas discharge laser pumps exist in the prior art; one such device is disclosed in U.S. patent application Ser. No. 327,388, now U.S. Pat. No. 3,387,227, entitled "A High Intensity Electrically Energized Gas Discharge Light Source Particularly Adaptable for Pumping Laser Systems," filed Dec. 2, 1963, by F. N. Mastrup et al., the inventor of the present invention. In that application, a device is disclosed wherein a pair of electrodes are positioned at the ends of a pressurizable annular arc discharge passageway which is formed by first and second substantially cylindrical members, one positioned within the other. The walls of one of the members is formed in part of an arc responsive gas evolving material. A ballast chamber is connected to the passageway to absorb any large pressure fluctuations in the passageway. The ballast chamber is also maintained at a less than atmospheric pressure so as to evacuate evolving gases and arc discharge products which form in the annular passageway each time the lamp is fired.

Another prior art device is disclosed in U.S. Pat. No. 3,209,281, entitled "Method and Apparatus for Dynamic Pinch Pulse Maser Pumping," by S. A. Colgate et al. In that patent application, a laserable material is encased within a transparent fluid-tight container and a cooled nitrogen mixture is passed through the container to keep the temperature of the pumped laser material at a low level. A transparent pressurizable cylinder is positioned adjacent the transparent liquid-tight tube and a gas is inserted into the cylinder. Electrodes are inserted into the cylinder for creating an arc discharge which in turn ionizes the gas, causing it to emit high energy radiation which is received by the laser material to pump it into an active state. A coil is wound around the gas container and an electrical current is passed through the coil to create a magnetic field to confine the plasma in a zone removed from the laserable material.

Another prior art device is disclosed in an article entitled "Laser: Devices and Systems—Part I," by Vogel, et al., published in Electronics, vol. 34, No. 43 (October 1961), pages 39–47. In that article, there is disclosed a device having a laser rod which is encased in a fluid-tight cylinder into which a liquid coolant can be injected for lowering the temperature of the laser and wherein the cylinder is positioned inside of a substantially larger pressurizable cylinder. The end members of the larger cylinder have electrodes embedded therein for creating an arc discharge therebetween. Gas is injected into the space between the larger and smaller cylinders and the arc between the electrodes ionizes the gas in an annular pattern around the laser material creating a uniform and high intensity pumping radiation for the laser material. After each discharge, a vacuum pump, which is connected into the arc discharge area, removes the contaminants and arc discharge products to prevent a discoloration of the cylinder walls.

One of the major problems encountered with these prior art devices aside from the cooling of the laserable material is the cooling of the material surrounding and in the immediate area of the arc gas discharge. In order to achieve continuous gas discharge, it is necessary to provide an efficient cooling system in this area. The apparatus of this invention achieves this end in a highly efficient and economical manner.

SUMMARY OF THE INVENTION

In a preferred embodiment of this invention, a laserable material is inserted within a transparent cylindrical member. A second transparent cylindrical member having a diameter slightly larger than the first member is positioned around the first member to form an annular, fluid-tight passageway. A plurality of hollow, annular members symmetrically positioned around the second transparent cylindrical member and adjacent to each other to define an annular gas discharge passageway. A pair of spaced apart, annular electrodes are positioned in the annular gas discharge passageway for creating an arc discharge in the defined gas passageway. Housing means cooperating with the electrodes and the first and second transparent cylindrical member to make the defined gas discharge passageway pressurizable. Means are provided for inserting a gas into the defined gas passageway and for providing a source of electrical power to the electrodes to cause an arc discharge in the gas passageway. Means are also provided for connecting the gas passageway to a pressure source which is substantially less than atmospheric so that the gas passageway can be emptied of gas discharge products. Means are also provided for passing a liquid through the defined fluid-tight passageway and through the hollow openings of the annular members, to cause a substantial dissipation in the heat generated by the ionized gases.

Accordingly, it is an object of the present invention to provide a pumping light source for a laserable material.

It is another object of the present invention to provide a pumping light source of a high energy output which is also capable of continuous use.

It is an additional object of the present invention to provide an apparatus for extracting undesired heat energy from laser pumping lamps.

The aforementioned and other objects of the present invention will become more apparent and better understood when taken in conjunction with the following description and drawings, throughout which like characters indicate like parts, and which drawings form a part of this application.

DESCRIPTION OF THE PREFERRED EMBODIMENT

Figure 1:
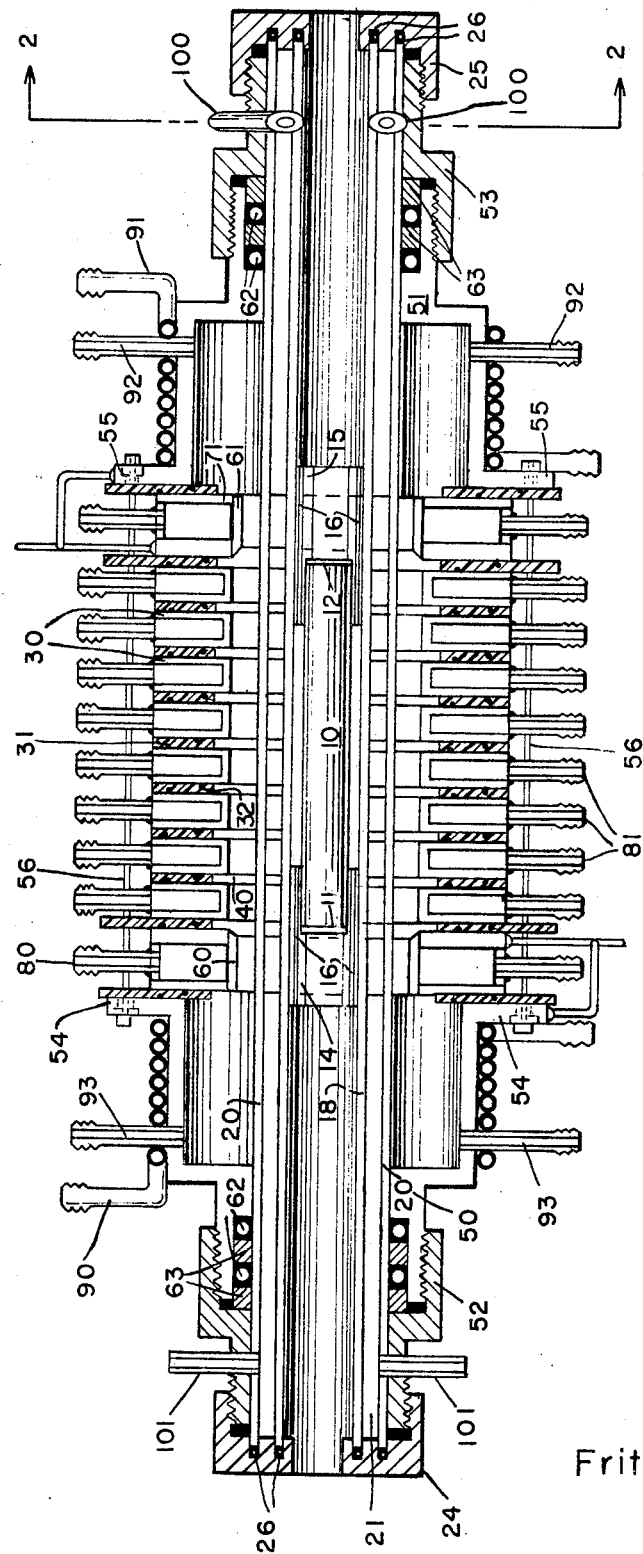
FIG. 1 illustrates in a sectioned view a preferred embodiment of the invention.
Figure 2:
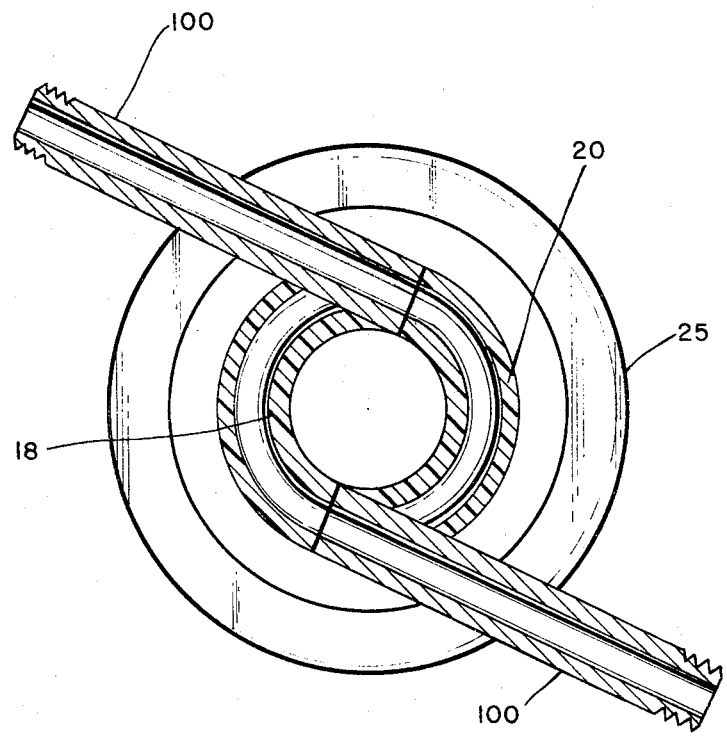
FIG. 2 illustrates a sectioned view of the embodiment of FIG. 1 taken along the sectioning lines 2—2.

Referring to FIG. 1, the laserable material 10, which may be a laser rod of ruby, has positioned on its end faces dielectric reflectors 11 and 12, one or both of which may be partially reflective, permitting the optical energy generated within the laserable material to be emitted for further utilization. End support members 14 and 15 support the laserable material 10 in a central position with respect to a first transparent cylindrical member 18. The end members also act as a shade to prevent radiation from falling on the reflectors 11 and 12 which, if allowed, would soon destroy the reflectors. A plurality of openings 16 pass through the end members 14 and 15. The purpose of these openings is to allow a cooling medium such as liquid nitrogen to be passed through the first cylindrical member and around the laser material to take away some of the heat generated when the laser is pumped. A second transparent cylindrical member 20 having a slightly larger diameter than the first member 18 forms an annual fluid passageway 21 with the first member 18. End caps 24 and 25, along with O-rings 26, seal the ends of the annual passageway 21, making it fluid-tight. A plurality of hollow annular members 30 are positioned around the second member 20 adjacent to each other to define an annular gas discharge passageway 40. Each one of the hollow annular members 30 is made of copper or other equally good thermal conductor. Ceramic insulators 31 are positioned between each of the hollow annular members 30 to electrically insulate them one from another. O-rings 32 are positioned between each ceramic insulator 31 and each annular member 30 to form a pressurizable passageway with the outer cylindrical member 20. Ballast chambers 50 and 51 are affixed to the end caps 24 and 25, respectively, by threaded couplers 52 and 53, respectively. The ballast chambers 50 and 51 have annular flange members 54 and 55, respectively, which are integrally formed therewith to provide a flush seat against the end ceramic insulating members 31, with O-rings 32 positioned against the flanges to form a pressurizable seal. A plurality of bolts 56 having a high voltage insulation thereon pass through the flange members 54 and 55, clamping the hollow annular members and the ceramic insulators together to form the pressurizable passageway 40. The end electrodes, which may be tungsten rings, are press-fitted on the hollow annular members 70 and 71, respectively. Fluid inlet pipes 80 are connected on one side of each of the annular members to provide a passage for the incoming fluid coolant. Fluid outlet pipes 81 are connected on the opposite side of each of the annular members to provide an exit path for the heated fluid. The fluid inlets may be connected to a source of pressurized water which is not shown for purposes of simplicity. A cooling tube 90 is wrapped around the ballast chamber 50 to provide an additional thermal path for heat dissipation from the ballast chamber 50. A similar cooling tube 91 is wrapped around the ballast chamber 51. A cooling fluid such as water is passed through tubes 90 and 91 to absorb heat from the ballast chambers 50 and 51 and to take heat away from these areas. Gas inlet pipes 92 project into the area enclosed by the ballast cavity 51 so that the passageway 40 can be filled with an arc discharge responsive-type gas (plasma type) from a source not shown for purposes of clarity. Gas outlet pipes 93 project into the area enclosed by the ballast chamber 50 to provide an exit path for the gases in passageway 40. Water inlet pipes 100 are placed through the coupling member 53 to provide an inlet path for the cooling liquid to the annular space 21. Liquid inlet pipes 100 are shown projecting through the walls of the coupling member 53 at an angle. The purpose of having the tubes inject the liquid at an angle rather than perpendicular to the passageway wall surface is to impart to the liquid a rotary motion. The rotary motion in moving down the length of the passageway 21 traces a helical path. This helical motion ensures that all surfaces of the second and first cylindrical members are covered with the liquid and that the temperature for various parts of the cylindrical members is maintained at a somewhat uniform level. The exit pipes 101 may be positioned at an angle with respect to the walls of coupling member 52 or they may be perpendicular to the inner wall surface. The angular placement of these exit tubes is not critical to the invention. Rectangular fiber rings 63 support the second cylindrical member 20 rigidly with respect to the coupling members 52 and 53. Positioned in a sandwiched manner between these ring elements are compression O-ring seals 62 which form a pressure-tight seal to retain all gases within the passageway 40.

Electrode 61 is connected via the annular hollow member 71 and a cable lead-in 70 to the flange 55 of ballast chamber 51. This connection ensures that the potential on the electrode 61 is the same as the potential on the walls of the ballast chamber 51. This lead is then connected to a source of high voltage potential not shown for purposes of simplicity. Electrode 60 is connected to the walls of the ballast chamber 50 through the copper walls of the annular hollow member 70 which is connected by a cable lead-in 71 to the flange 54 of the ballast chamber. The flange 54 is then electrically connected to a source of high potential, not shown, for causing an arc discharge between electrodes 60 and 61. The transparent first cylindrical member 18 may be a colored glass tube which acts as a filter to certain spectrums of radiation to effectively filter out all radiations from the ionized gases which do not directly contribute to the pumping of the laserable material 10.

In operation, a small quantity of a plasma gas, such as xenon, is injected into the passageway 40 via the gas inlet tubes 92. Electrodes 60 and 61 are energized, creating an arc discharge in the passageway which ionizes the xenon gas. The ionized gas then emits radiation in a broad spectrum which includes a frequency that will impart a pumping effect to the laser rod 10. The radiation passes through the second transparent member 20 and the first transparent member 18, and if this member is made of the colored glass, it will filter out some of the undesirable frequencies of radiation. The remaining radiation will pass into the laser rod, imparting to it energy whch causes the laser to become activated. The gas outlets 93, which are connected to a pressurized source, which is less than atmospheric, draws off all gas discharge products from the passageway 40 which are formed when the gas is ionized. In this manner, a continual flow of gas comes in through the inlet, is ionized to form various by-products, which are in turn drawn off into the gas outlet system to provide a continuous high level discharge. Water is passed through the various liquid inlet valves to cool the members which are subjected to the heating of the gas discharge. This water may be recirculated or cooled and fed back into the liquid inlets or it may be just bled off and discarded. The laserable material also generates heat, some of which passes through the quartz tube 18 into the passageway 21, where it in turn is drawn off through the circulation of the liquid in this passageway. The ballast chambers 50 and 51, positioned at each end of the passageway 40, provide a volume which is substantially larger than the volume of the passageway so that increases in pressure in the passageway caused by the arc discharge will be somewhat absorbed, allowing a greater pressure excursion to take place in the passageway 40 without causing deleterious effects. The ballast chambers preferably have a sufficient volume for interception of the gas evolved during a single discharge in the passageway 40 without building up appreciable pressure within the ballast chambers. The volume of chambers 50 and 51 should be at least, in combination, 10 or 20 times that of passageway 40. By quickly removing exhaust and other discharge products and contaminants from the passageway 40, the problem of deposition of opaque or light absorbing contaminants on the transparent cylindrical members is minimized.

While there has been shown what is considered to be the preferred embodiment of the present invention, it will be manifest that many changes and modifications may be made therein without departing from the essential spirit of the invention. It is intended, therefore, in the annexed claims, to cover all such changes and modifications as fall within the true scope of the invention.

What is claimed is:

1. A light source comprising:
 a first cylindrical member;
 a second cylindrical member having a diameter slightly larger than said first member forming with said member a liquid-tight annular passageway;
 a plurality of hollow annular members symmetrically positioned around said second cylindrical member forming a pressurizable gas passageway therewith;
 a pair of annular electrodes spaced apart and projecting into said gas passageway for creating an arc discharge therein;
 means for inserting an ionizable gas into said passageway; and
 means for passing a liquid through said fluid-tight passageway and said hollow annular members to cool said light source.

2. The invention, according to claim 1, wherein said hollow annular members are made of a conductive material and wherein insulators are positioned between said members to insulate each from the other.

3. The invention, according to claim 1, and further comprising a ballast chamber communicating with said pressurizable gas passageway for receiving gases vented from said passageway.

4. The invention, according to claim 1, wherein said first and second cylindrical members are transparent only to the radiations of interest.

5. The invention, according to claim 1, wherein said annular electrodes are hollow and a liquid is passed therethrough to cool said electrodes.

6. In combination:
 a first and second transparent cylindrical members forming an annular fluid passageway;
 a plurality of hollow annular members positioned around said first and second transparent cylindrical members forming a gas passageway therewith;
 a pair of spaced apart electrodes projecting into said gas passageway for creating an arc discharge therein;
 means for sealing said gas passageway to make it pressurizable;
 means for passing a gas through said passageway; and
 means for passing a liquid through said hollow annular members and said fluid passageway.

7. A light source particularly adapted for pumping a laserable material;
 first and second transparent cylindrical members forming an annular fluid passageway;
 a laserable material positioned substantially centrally within said first and second cylindrical members;
 a pair of spaced electrodes positioned around the outside of said first and second members;
 a plurality of hollow annular members positioned around said first and second transparent cylindrical members forming with said electrodes a gas passageway within which an electric discharge occurs between said electrodes; and
 means for passing a fluid through said fluid passageway and said hollow annular members.

8. The invention, according to claim 7, wherein said electrodes are annular hollow electrodes positioned to cause an annular arc discharge in said gas passageway and wherein fluid is passed through the hollow of said electrodes to facilitate cooling.

9. The invention, according to claim 7, wherein the liquid is injected into said fluid passageway at an angle causing the fluid to take a helical path through said passage way.

10. In combination:
 a first transparent cylindrical member;
 a second transparent cylindrical member having a larger diameter than said first member, positioned around said first member to define an annular fluid passageway;
 means sealing said fluid passageway at each end;
 a plurality of hollow annular members positioned adjacent each other around said second transparent member forming an annular passageway therewith;
 a pair of spaced annular electrodes positioned in said annular passageway for generating an electric arc discharge therein;
 ballast chamber means sealing said annular passageway;
 fluid means for providing a liquid flow through said hollow annular members and said annular passageway.

11. The invention, according to claim 10, wherein said pair of spaced annular electrodes are hollow and a fluid is passed therein.

12. The invention, according to claim 10, wherein said ballast chamber means is a pair of conductive chambers positioned adjacent each electrode and in electrical contact therewith.

13. The invention, according to claim 10, wherein said means for providing a liquid flow in said annular passageway provides a helical fluid flow.

14. The invention, according to claim 10, and further comprising cooling tubes wrapped around said ballast chamber means and connected to said fluid means for providing a fluid flow, through said tubes.

15. The invention, according to claim 10, wherein said hollow annular members are conductive and further comprising insulating means insulating each of said hollow annular members from each other.

References Cited

UNITED STATES PATENTS

| | | |
|---|---|---|
| 3,265,989 | 8/1966 | Gürs. |
| 3,356,966 | 12/1967 | Miller. |
| 3,361,989 | 1/1968 | Sirons. |
| 3,440,558 | 4/1969 | Cameron. |
| 3,448,403 | 6/1969 | Vislocky. |
| 3,453,558 | 7/1969 | Abegg et al. |
| 3,454,900 | 7/1969 | Clay et al. |
| 3,460,054 | 8/1969 | Rambauske et al. |

OTHER REFERENCES

Maecker: Z. Naturforschg., vol. 11a, pp. 457–59, 1956.
Shumaker: Rev. Sci. Inst., vol. 32, pp. 65–67, January 1961.

RONALD L. WIBERT, Primary Examiner

E. BAUER, Assistant Examiner

U.S. Cl. X.R.

313—25